United States Patent Office 3,102,892
Patented Sept. 3, 1963

3,102,892
CYCLOPENTANOPHENANTHRENE COMPOUNDS AND PROCESS
John A. Zderic, Mexico City, Mexico, assignor, by mesne assignments, to Syntex Corporation, a corporation of Panama
No Drawing. Filed Feb. 6, 1961, Ser. No. 87,114
23 Claims. (Cl. 260—343.2)

The present invention relates to novel cyclopentanophenanthrene compounds and to a process for the production thereof.

More particularly the present invention relates to 13,17α,21-trihydroxy-3,20-diketo - 11,13 - seco - Δ⁴ - pregnen-11-oic acid 11,13-lactone, to the C–1,2 dehydro derivative thereof as well as to the C–21 esters of said compounds.

The novel compounds of the present invention which are potent cortical hormones possessing anti-inflammatory, glycogenic, thymolytic, catabolic, anti-estrogenic, anti-androgenic and anti-gonadotrophic activities are represented by the following formula:

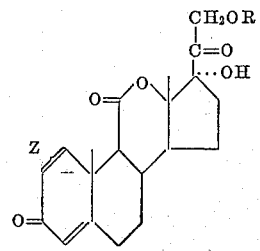

In the above formula Z represents a double bond or a saturated linkage between C–1 and C–2 and R represents hydrogen or the acyl radical of a hydrocarbon carboxylic acid of less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 8 carbon atoms, amino or halogen. Typical ester groups are the acetate, propionate, enanthate, caproate, benzoate, trimethylacetate, phenoxyacetate, t-butylacetate, cyclopentylpropionate, aminoacetate and β-chloropropionate.

The novel compounds of the present invention are prepared by a process illustrated by the following equation:

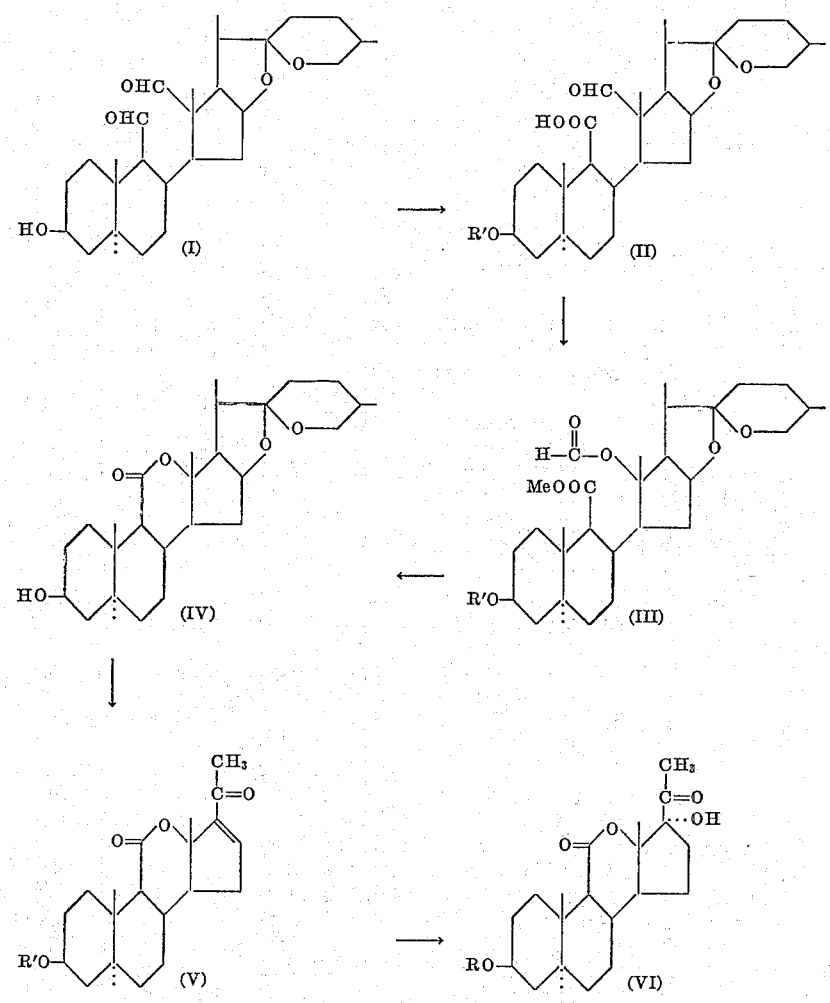

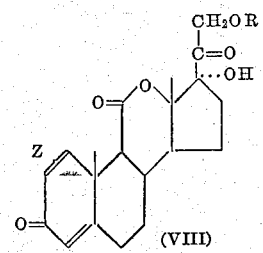
(VIII)

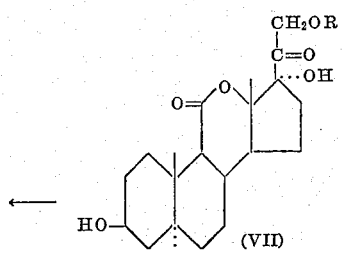
(VII)

In the above formula R and Z have the same meaning as previously set forth; R' represents the acyl radical of a hydrocarbon carboxylic acid of the type mentioned previously and is preferably the acetyl radical.

In practicing the process outlined above the starting compound 11,12 - seco - 5α-22α-spirostan-3β-ol-11,12-dial (I) is prepared by oxidizing 11β,12β-dihydroxy-tigogenin with lead tetraacetate in an inert solvent such as benzene. The dialdehyde (I) is esterified at C-3 by treatment with acetic anhydride in pyridine and the thus formed C-3 acetate is oxidized with 8 N chromic acid to furnish 3β-acetoxy-12-aldehydo - 11,12 - seco - 5α,22α - spirostan-11-oic acid (II). Upon reaction with diazomethane, the methyl ester of the latter acid is formed which is then subjected to a Baeyer-Villiger reaction using, for example, perbenzoic acid, to form the methyl ester of 3β-acetoxy-11,13-seco-5α,22α-spirostan-13-ol-11-oic acid 13-formate (III). The formate and ester groups are hydrolyzed by alkali treatment and upon subsequent acid treatment, there is formed the lactone, namely 3β,13-dihydroxy-11,13-seco-5α,22α-spirostan-11oic acid 11,13-lactone (IV). Degradation of the spiroketal side chain is then effected by conventional procedure as by reaction with acetic anhydride at about 200°, oxidation of the resulting pseudo compound to the diosone and alkaline hydrolysis and acetylation of the latter thus forming 3β,13-dihydroxy-20-keto-11,13-seco-Δ16-5α-pregnen-11-oic-acid-11,13-lactone acetate (V).

For introduction of the hydroxyl group at C-17α, the 16,17-double bond is first epoxidized, preferably by reaction with t-butylhydroperoxide to form the 16α,17α-epoxide of V; the epoxide ring is then opened by treatment with hydrogen bromide and the resulting 16β-bromo-17α-hydroxy compound is reductively debrominated as by refluxing with Raney nickel to form 3β,13,17α-trihydroxy-20-keto-11,13-seco-5α-pregnan-11-oic acid 11,13-lactone 3-acetate (VI: R=acetate). Upon treatment with acid the 3β-acetate group is transformed into the 3β-hydroxy group (VI: R=hydrogen).

For introduction of a hydroxyl group at C-21 the latter compound is monobrominated and there is formed 21-bromo - 3β,13,17α - trihydroxy - 20 - keto-11,13-seco-5α-pregnan-11-oic acid 11,13-lactone which is then acetolysed in a conventional manner, preferably with previous substitution of iodine for bromine, to thus form 3β,13,17α,21-tetrahydroxy-20-keto-11,13-seco - 5α - pregnan-11-oic acid 11,13-lactone-21-acetate (VII: R=acetate). Upon oxidation of the latter compound with 8N chromic acid there is formed 13,17,21-trihydroxy-3,20-diketo-11,13-seco-5α-pregnan-11-oic acid 11,13-lactone 21-acetate. For introduction of unsaturation in ring A, the latter compound is dibrominated at C-2 and C-4 and then either dehydrobrominated as by treatment with calcium carbonate in dimethylformamide or dimethylacetamide to produce 13,17α,21 - trihydroxy-3,20-diketo-11,13-lactone-Δ1,4 - pregnadien - 11 - oic acid 11,13 - lactone 21-acetate (VIII: Z=double bond) or dehydrobrominated selectively as by heating with an alkali metal iodide followed by reductive dehalogenation to yield the Δ4-compound, that is, 13,17α,21 - trihydroxy - 3,20 - diketo - 11,13-seco - Δ4 - pregnen - 11 - oic acid 11,13-lactone 21-acetate (VIII: Z=saturated linkage). The latter compound can also be formed by oxidation of the previously mentioned 13,17α,21 - trihydroxy - 3,20 - diketo-11,13-seco-5α-pregnan-11-oic acid 11,13-lactone 21-acetate with selenium dioxide or by oxidation of 13,17α,21-trihydroxy-3,20-diketo-11,13-seco-Δ4-pregnen-11-oic acid 11,13 - lactone-21-acetate (VIII: Z=saturated linkage).

Upon hydrolysis as by reaction with methanolic perchloric acid, the acetoxy group at C-21 is converted into the free C-21 hydroxy compound which can then be reacylated with other hydrocarbon carboxylic acids of the type mentioned previously.

The following examples serve to illustrate but are not intended to limit the invention:

*Example I*

To a mixture of 81 g. of 11β,12β-dihydroxy-tigogenin, 1.4 liters of glacial acetic acid and 2.1 liters of thiophene-free benzene, 121 g. of lead tetraacetate were added and the mixture was stirred at room temperature for 5 minutes. 2 liters of water, containing 1 kg. of sodium acetate and 40 g. of sodium iodide were added, the color was discharged by addition of 800 ml. of saturated aqueous sodium thiosulfate solution and the product extracted twice, using each time 2 liters of ethyl acetate. The pooled extracts were washed with aqueous sodium bicarbonate and water, dried over anhydrous sodium sulfate and evaporated to dryness. The residue was crystallized from a mixture of 600 ml. of methanol and 125 ml. of water. Thus 75.2 g. of 11,12-seco-22α-allospirostan-3β-ol-11,12-dial were obtained; M.P. 146–147° C.; $[\alpha]_D$ −72° (chloroform).

The above compound was reacted with 75 ml. of acetic anhydride in 400 ml. of pyridine, at room temperature and was allowed to stand overnight. The mixture was then poured into water, heated for 1 hour on a steam-bath, cooled and the solid was collected by filtration, washed consecutively with diluted hydrochloric acid, aqueous sodium bicarbonate and with water, dried and crystallized from acetone-hexane. Thus 11,12-seco-22α-allospirostan-3β - ol - 11,12 - dial acetate was obtained; M.P. 152–154°; $[\alpha]_D$ −56° (chloroform).

55 g. of the foregoing compound in 1000 ml. of acetone were treated with 7.8 ml. of 8 N chromic acid, prepared in dilute sulfuric acid, under an atmosphere of nitrogen and at room temperature for 35 minutes. The mixture was then diluted with water, the product extracted with ethyl acetate, the extract water-washed, dried over anhydrous sodium sulfate and evaporated to dryness. Crystallization from acetone-hexane gave 3β-acetoxy-12-aldehydo-11,12-seco-22α-allospirostan-11 - oic acid; M.P. 170–172°; $[\alpha]_D$ −61° (chloroform).

By treatment of the foregoing acid with an ethereal solution of diazomethane in the conventional manner, the methyl ester of the acid was produced; M.P. 153–155°; $[\alpha]_D$ −65° (chloroform).

To 660 ml. of 0.5 N ethereal solution of perbenzoic acid were added 44 ml. of acetic acid containing 44 g. of the methyl ester of 3β-acetoxy-12-aldehydo-11,12-seco-22α-allospirostan-11-oic acid and the mixture was kept in the dark at room temperature for 50 hours. It was then diluted with 4 liters of ether and washed several times with 5% aqueous sodium bicarbonate, finally with water, dried over anhydrous sodium sulfate and evaporated to dryness, leaving 48 g. of neutral material. This, in its turn, was refluxed with 680 ml. of 5% methanolic potassium hydroxide, under an atmosphere of nitrogen for 4 hours. At the end of this period the mixture was extracted with ethyl acetate; the aqueous phase was acidified with dilute hydrochloric acid and left overnight at room temperature. The product was then extracted, repeated with ethyl acetate. The cooled extracts were water-washed, dried over anhydrous sodium sulfate and the solvent was evaporated. The residue crystallized from ether-hexane; thus 3$\beta$,13-dihydroxy-11,13-seco-5$\alpha$, 22$\alpha$-spirostan-11-oic acid-11,13-lactone was obtained; M.P. 271–273°; [$\alpha$]$_D$ —24° (chloroform). 40 g. of the foregoing compound were heated with 200 ml. of acetic anhydride in a sealed tube at 200° C. for 55 minutes. The mixture was then cooled, the excess of anhydride was hydrolyzed by the addition of 50 ml. of water; there were then added 20 g. of chromium trioxide in 250 ml. of 80% acetic acid, little by little, while stirring and at about 15° C. Stirring was continued for 3 hours at room temperature, the mixture was then diluted with water and the product extracted with ether. The extract was washed with water, dried over anhydrous sodium sulfate and the ether was evaporated. The residue was mixed with 2 liters of aqueous 60% acetone containing 20 g. of potassium hydroxide, and refluxed for 5 hours. At the end of this time, the liquid was concentrated to small volume at reduced pressure, then diluted with 100 ml. of water, acidified with concentrated hydrochloric acid and stirred at room temperature overnight. It was then extracted with ether, the extract was water-washed, dried over anhydrous sodium sulfate and evaporated. The residue was treated with 40 g. of acetic anhydride in 200 ml. of pyridine at room temperature and the mixture was allowed to stand overnight. It was then diluted with 1 liter of water, the solid collected by filtration, water-washed, dried and crystallized from acetone-hexane. Thus 3$\beta$-acetoxy-13-hydroxy-20-keto-11,13-seco-$\Delta^{16}$-5$\alpha$-pregnen-11-oic-acid-11,13-lactone was obtained.

20 g. of the foregoing compound in 12 ml. of benzene, 1 ml. of triton B (benzyltrimethylammonium hydroxide, Midwest Laboratories Inc.) and 1.2 ml. of t-butylhydroperoxide (Lucidol Division, Wallace and Tiernan, Inc.) were reacted at room temperature overnight. The mixture was then diluted with 1% hydrochloric acid, saturated with sodium chloride and extracted repeatedly with ether. The combined extracts were washed with water to neutral, dried over anhydrous sodium sulfate and evaporated to dryness. By crystallization from acetone-hexane, 3$\beta$-acetoxy-13-hydroxy-20-keto-16$\alpha$,17$\alpha$-oxido-11,13-seco-5$\alpha$-pregnan-11-oic-acid-11,13-lactone was obtained.

14 g. of the foregoing oxido-compound in 160 ml. of glacial acetic acid was treated with 30 ml. of acetic acid saturated with dry hydrogen bromide, stirring at room temperature for 1.15 hours. The mixture was then diluted with ice water and the bromohydrin which precipitated was collected by filtration, washed with water and refluxed with 100 g. of Raney nickel in 1 liter of acetone for 5 minutes. The nickel was removed by filtration, the filtrate was evaporated to dryness and the residue crystallized from acetone-hexane, thus furnishing 3$\beta$-acetoxy-13,17$\alpha$-dilhydroxy-20-keto-11,13-seco-5$\alpha$-pregnan-11-oic acid 11,13-lactone.

The 3-acetoxy group of the foregoing compound was hydrolyzed by treating a solution of 10 g. of said compound with 500 ml. of methanol, saturated with hydrogen chloride, at room temperature for 0.5 hour. Subsequent dilution with water and collection of the precipitate by filtration, finally water-washing, drying and recrystallization from acetone, afforded 3$\beta$-13,17$\alpha$-trihydroxy-20-keto-11,13-seco-5$\alpha$-pregnan-11-oic acid 11,13-lactone.

A mixture of 8 g. of the foregoing compound and 600 ml. of chloroform was treated under stirring with a chloroform solution containing 1.1 molar equivalents of bromine; the bromine solution was added in the course of 1 hour and maintaining a temperature below 20° C. The mixture was then stirred for 20 minutes more, washed with saturated aqueous sodium bicarbonate solution and then with water, dried over anhydrous sodium sulfate and the solvent was evaporated under reduced pressure, in a water-bath, at a temperature below 40° C. Thus was obtained 21-bromo-3$\beta$,13,17$\alpha$-trihydroxy-20-keto - 11,13-seco-5$\alpha$-pregnan-11-oic acid 11-13-lactone, which was used for the next step without further purification.

The above bromo-compound was dissolved in 1600 ml. of acetone, mixed with 6 g. of sodium iodide and refluxed for 2 hours; at the end of this time 90 g. of anhydrous potassium acetate were added and the mixture was refluxed for 40 additional hours.

After concentrating the mixture to small volume under reduced pressure, it was diluted with water and extracted with several portions of ethyl acetate. The combined extracts were washed with water, dried over anhydrous sodium sulfate and evaporated to dryness. The residue crystallized from acetone-hexane, yielding 3$\beta$,13,17$\alpha$,21-tetrahydroxy - 20 - keto-11,13-seco-5$\alpha$-pregnan-11-oic acid-11, 13-lactone 21-acetate.

To a solution of 4 g. of the above compound in 200 ml. of acetone, cooled in an ice-bath was added a solution of 8 N chromic acid, prepared in dilute sulfuric acid, little by little, while stirring and under an atmosphere of nitrogen, until the color of chromium trioxide persisted in the mixture, which was then stirred for 5 minutes longer. The product was precipitated by addition of water, collected by filtration, water-washed, dried and crystallized from acetone-hexane. Thus 13,17$\alpha$,21-trihydroxy-3,20-diketo-11,13-seco-5$\alpha$-pregnan-11-oic acid 11,13-lactone-21-acetate was obtained.

To a mixture of 12 ml. of anhydrous tetrahydrofuran and 2 ml. of glacial acetic acid were added 2 g. of the above steroid and the mixture was then treated with a few drops of a saturated solution of dry hydrogen bromide in glacial acetic acid at room temperature and while stirring. There were then added little by little, 2.1 molecular equivalents of bromine, stirring the mixture and maintaining its temperature below 20° C. After the addition of the bromine was complete, stirring was continued for 10 minutes, the product precipitated by addition of water, collected by filtration, washed with water and dried in vacuo. Thus crude 2$\alpha$,4$\alpha$-dibromo-13,17$\alpha$,21-trihydroxy-3,20-diketo-11,13-seco-5$\alpha$-pregnen-11-oic acid 11,13-lactone 21-acetate was produced.

To a suspension of 4 g. of calcium carbonate in 40 ml. of dimethylacetamide, heated almost to the boiling point, was added a solution of 2 g. of the above dibromo-compound in 10 ml. of dimethylacetamide. The mixture was refluxed for 1 hour, cooled, filtered and the solvent was evaporated under reduced pressure. Upon trituration with dilute hydrochloric acid there was obtained a crystalline solid, which was collected, washed with water, dried and crystallized from methanol. Thus 13,17$\alpha$,21-trihydroxy-3,20-diketo - 11,13 - seco-$\Delta^{1,4}$-pregnadien-11-oic-acid 11,13-lactone 21-acetate was obtained.

*Example II*

To a solution of 0.67 g. of bromine in 20 ml. of acetone (prepared by adding the bromine little by little and waiting until decolorization before each addition), cooled at 0° C., was added 1.8 g. of sodium carbonate, the mixture was then stirred for 25 minutes at 0° C., filtered and to the filtrate was added 8 g. of sodium iodide dissolved in 400 ml. of acetone. The mixture was refluxed for 45 minutes further and cooled.

To the above solution were added 3.5 g. of 2$\alpha$,4$\alpha$-dibromo-13,17$\alpha$,21-trihydroxy-3,20-diketo-11,13 - seco - 5$\alpha$-pregnan-11-oic acid 11,13-lactone 21-acetate and the mixture was refluxed for 5 hours. 3.5 g. of oxalic acid were then added and refluxing continued for half an hour longer. The cooled mixture was diluted with ethyl acetate, filtered and the filtrate was washed with water to neutral, and treated finally with 5 ml. of acetic acid and 25 g. of zinc dust. The mixture was stirred until complete decolorization, filtered and the filtrate washed with water. The solution was then evaporated to dryness and the residue chromatographed on silica gel. By elution with benzene-ether there was obtained 13,17α,21-trihydroxy-3,20-diketo-11,13-seco-Δ4-pregnen-11-oic acid 11,13-lactone 21-acetate, which was further purified by recrystallization from methanol.

A mixture of 1 g. of the above compound, 50 ml. of t-butanol, 500 mg. of selenium dioxide and a few drops of pyridine was refluxed under an atmosphere of nitrogen for 2 days. It was then filtered through celite, the filtrate was evaporated to dryness under reduced pressure and the residue was triturated with water to give a solid which was collected by filtration, washed with water, dried and purified by chromatography on silica gel. By elution with benzene-ether there were obtained crystalline fractions, which were further purified by recrystallization from ethyl acetate in the presence of decolorizing charcoal and finally by recrystallization from methanol. Thus was obtained 13,17α,21-trihydroxy-3,20-diketo-11,13-seco - Δ1,4 - pregnadien-11-oic-acid-11,13-lactone 21-acetate, identical with the final compound of the preceding example.

*Example III*

A mixture of 1 g. of 13,17α,21-trihydroxy-3,20-diketo-11,13-seco-5α-pregnan-11-oic acid 11,13-lactone 21-acetate (compare Example I), 50 ml. of t-butanol, 1 g. of selenium dioxide and a few drops of pyridine was refluxed under an atmosphere of nitrogen for 4 days; the product was elaborated as described for the selenium-dioxide oxidation in Example I. Thus 13,17α,21-trihydroxy-3,20-diketo-11,13-seco-Δ1,4-pregnadien - 11 - oic-acid 11,13-lactone 21-acetate was produced.

*Example IV*

A suspension of 1 g. of 13,17α,21-trihydroxy-3,20-diketo-11,13-seco-Δ4-pregnen-11-oic-acid 21-acetate (cf. Example I) in 40 ml. of 0.27 N methanolic perchloric acid (prepared by mixing 39 ml. of methanol with 1 ml. of 72% perchloric acid) was shaken at room temperature for 20 hours. The resulting solution was diluted with water, left 2 hours in the refrigerator and the precipitate was collected by filtration, water-washed, dried and recrystallized from ethanol, affording 13,17α,21-trihydroxy-3,20-diketo-11,13-seco-Δ4-pregnen-11-oic acid 11,13-lactone.

*Example V*

Exactly as described in the foregoing example, 13,17α,21-trihydroxy - 3,20 - diketo-11,13-seco-Δ1,4-pregnadien-11-oic-acid 11,13-lactone 21-acetate was converted to 13, 17α,21 - trihydroxy - 3,20 - diketo-11,13-seco-Δ1,4-pregnadien-11-oic-acid 11,13-lactone.

*Example VI*

A mixture of 1 g. of 13,17α,21-trihydroxy-3,20-diketo-11,13 - seco-Δ4-pregnen-11-oic-acid 11,13-lactone (Example IV), 5 ml. of pyridine and 2 ml. of propionic anhydride was left at room temperature overnight, then poured into water, the mixture heated for half an hour on the steam-bath, then cooled, the solid collected by filtration, washed with water, dried and purified by crystallization from acetone-hexane. Thus 13,17α,21 - trihydroxy - 3,20-diketo-11,13-seco-Δ4-pregnen-11-oic-acid 11,13-lactone 21-propionate was obtained.

*Example VII*

By a procedure similar to that described in the foregoing example using the respective acid anhydride or chloride in pyridine, several 21-esters of 13,17α,21-trihydroxy - 3,20 - diketo-11,13-seco-Δ4-pregnen-11-oic acid 11,13-lactone (Example IV) and of 13,17α,21-trihydroxy - 3,20-diketo-11,13-seco-Δ1,4-pregnadien-11-oic-acid 11,13-lactone (Example V) were prepared, more particularly the 21-cyclopentylpropionate and the benzoate of 13,17α,21 - trihydroxy-3,20-diketo-11,13-seco-Δ4-pregnen-11-oic-acid 11,13-lactone and of 13,17α,21-trihydroxy-3, 20 - diketo-11,13-seco-Δ1,4-pregnadien-11-oic-acid 11,13-lactone, and the 21-propionate of 13,17α,21-trihydroxy-3, 20-diketo-11,13-seco-Δ1,4-pregnadien - 11 - oic - acid 11, 13-lactone.

I claim:
1. A compound of the following formula:

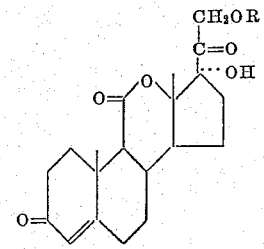

wherein R is selected from the group consisting of hydrogen and hydrocarbon carboxylic acyl of less than 12 carbon atoms.

2. 13,17α,21-trihydroxy-3,20 - diketo - 11,13 - seco-Δ4-pregnen-11-oic-acid 11,13-lactone.

3. The C–21-hydrocarbon carboxylic acid ester of less than 12 carbon atoms of 13, 17α,21-trihydroxy-3,20-diketo-11,13-seco-Δ4-pregnen-11-oic-acid 11,13-lactone.

4. 13,17α,21 - trihydroxy - 3,20 - diketo - 11,13 - seco-Δ4-pregnen-11-oic-acid 11,13-lactone 21-acetate.

5. 13,17α,21 - trihydroxy - 3,20 - diketo-11,13-seco-Δ4-pregnen-11-oic-acid 11,13-lactone 21-propionate.

6. 13,17α,21 - trihydroxy - 3,20 - diketo - 11,13 - seco-Δ4-pregnen-11-oic acid 11,13-lactone 21-cyclopentylpropionate.

7. A compound of the follownig formula:

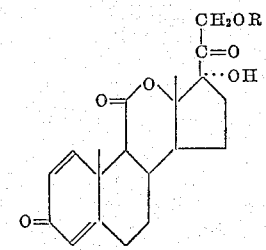

wherein R is selected from the group consisting of hydrogen and hydrocarbon carboxylic acyl of less than 12-carbon atoms.

8. 13,17α,21-trihydroxy-3,20-diketo-11,13 - seco - Δ1,4-pregnadien-11-oic acid-11,13-lactone.

9. The C–21-hydrocarbon carboxylic acid ester of less than 12 carbon atoms of 13,17α,21-trihydroxy-3,20-diketo-11,13-seco-Δ1,4-pregnadien-11-oic acid-11,13-lactone.

10. 13,17α,21 - trihydroxy-3,20-diketo-11,13-seco-Δ1,4-pregnadien-11-oic acid-11,13-lactone 21-acetate.

11. 13,17α,21-trihydroxy-3,20-diketo-11,13-seco - Δ1,4-pregnadien-11-oic-acid 11,13-lactone 21-propionate.

12. 13,17α,21 - trihydroxy - 3,20 - diketo - 11,13 - seco-Δ1,4-pregnadien-11-oic acid 11,13-lactone 21-cyclopentylpropionate.

13. A compound of the following formula:

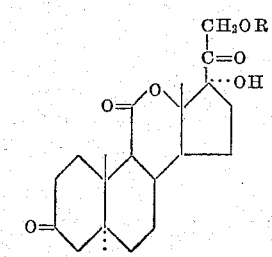

wherein R is selected from the group consisting of hydrogen and hydrocarbon carboxylic acyl of less than 12 carbon atoms.

14. 13,17α,21 - trihydroxy - 3,20-diketo-11,13-seco-5α-pregnan-11-oic acid 11,13-lactone 21-acetate.

15. A compound of the following formula:

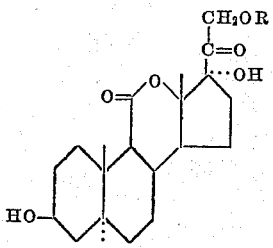

wherein R is selected from the group consisting of hydrogen and hydrocarbon carboxylic acyl of less than 12 carbon atoms.

16. 3β,13,17α,21-tetrahydroxy-20-keto-11,13-seco - 5α-pregnan-11-oic acid 11, 13-lactone 21-acetate.

17. A compound of the following formula:

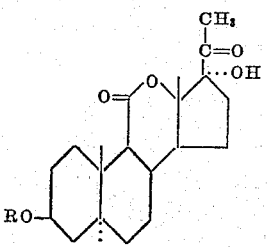

wherein R is selected from the group consisting of hydrogen and hydrocarbon carboxylic acyl of less than 12 carbon atoms.

18. 3β,13,17α-trihydroxy - 20 - keto - 11,13 - seco - 5α-pregnan-11-oic acid 11,13-lactone.

19. 3β,13,17α - trihydroxy-20-keto-11,13-seco-5α-pregnan-11-oic acid 11,13-lactone 3-acetate.

20. A compound of the following formula:

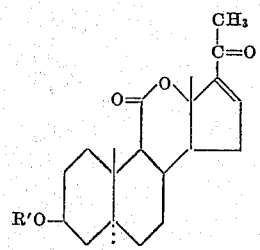

wherein R' represents hydrocarbon carboxylic acyl of less than 12 carbon atoms.

21. 3β-acetoxy - 13 - hydroxy - 20-keto-11,13-seco-$\Delta^{16}$-5α-pregnen-11-oic-acid 11,13-lactone.

22. 3β,13 - dihydroxy - 11,13-seco-5α,22α-spirostan-11-oic-acid 11,13-lactone.

23. 3β-acetoxy-12-aldehydo-11,12 - seco - 5α,22α - spirostan-11-oic acid.

References Cited in the file of this patent

Rothman et al.: Jour. Amer. Chem. Soc., volume 76 (1954), pages 527-532.